(12) United States Patent
Enomoto et al.

(10) Patent No.: US 8,905,649 B2
(45) Date of Patent: Dec. 9, 2014

(54) OPTICAL FIBER TERMINAL FIXING MEMBER, OPTICAL CONNECTOR, AND OPTICAL FIBER CABLE WITH CONNECTOR

(75) Inventors: Noritsugu Enomoto, Shiga (JP); Toshikuni Kondou, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/819,368

(22) PCT Filed: Oct. 19, 2011

(86) PCT No.: PCT/JP2011/074070
§ 371 (c)(1),
(2), (4) Date: Feb. 27, 2013

(87) PCT Pub. No.: WO2012/053562
PCT Pub. Date: Apr. 26, 2012

(65) Prior Publication Data
US 2013/0163931 A1    Jun. 27, 2013

(30) Foreign Application Priority Data
Oct. 19, 2010  (JP) .................................. 2010-234903

(51) Int. Cl.
G02B 6/38    (2006.01)
(52) U.S. Cl.
CPC ............ *G02B 6/3858* (2013.01); *G02B 6/3887* (2013.01); *G02B 6/3879* (2013.01); *G02B 6/3869* (2013.01)
USPC ............................................ 385/65; 385/75

(58) Field of Classification Search
USPC ................................................ 385/59–60, 65
See application file for complete search history.

(56) References Cited

U.S. PATENT DOCUMENTS 4,553,814 A * 11/1985 Bahl et al. ........................ 385/86
4,846,564 A * 7/1989 Caron et al. .................. 385/137
(Continued)

FOREIGN PATENT DOCUMENTS

JP    63 73706    5/1988
JP    3 103411    10/1991
(Continued)

OTHER PUBLICATIONS

BMW Parts Guide 1994, Specifically #11 (clip).*

(Continued)

*Primary Examiner* — Eric Wong
(74) *Attorney, Agent, or Firm* — Oblon, Spivak, McClelland, Maier & Neustadt, L.L.P.

(57) ABSTRACT

An optical fiber terminal fixing member is configured to be inserted into an optical connector to fix an optical fiber terminal to a housing. The optical connector includes the optical fiber terminal attached to an end of an optical fiber cable, and the housing that holds the optical fiber terminal. The optical fiber cable includes an optical fiber, a tensile member disposed along a longitudinal direction of the optical fiber, and a coating portion that covers the optical fiber and the tensile member. The optical fiber terminal fixing member includes a main body, a fitting portion formed so as to project from the main body and configured to fit into a groove provided on an outer circumference of the optical fiber terminal, and a fixing structure for fixing the optical fiber terminal fixing member to the housing.

8 Claims, 11 Drawing Sheets

(56) References Cited

U.S. PATENT DOCUMENTS

| | | | |
|---|---|---|---|
| 6,357,931 B1 * | 3/2002 | Shirakawa et al. | 385/75 |
| 6,726,371 B2 | 4/2004 | Nishita | |
| 6,793,412 B2 | 9/2004 | Nishita | |
| 7,264,402 B2 * | 9/2007 | Theuerkorn et al. | 385/59 |
| 7,559,704 B2 * | 7/2009 | Togami et al. | 385/92 |
| 2004/0076389 A1 | 4/2004 | Ozaki | |

FOREIGN PATENT DOCUMENTS

| | | |
|---|---|---|
| JP | 10 142451 | 5/1998 |
| JP | 2001 147346 | 5/2001 |
| JP | 2002 107573 | 4/2002 |
| JP | 2004 138707 | 5/2004 |
| JP | 3813496 | 8/2006 |

OTHER PUBLICATIONS

Photo of part #11 (for reference U).*

International Search Report Issued Nov. 15, 2011 in PCT/JP11/074070 Filed Oct. 19, 2011.

* cited by examiner

OPTICAL FIBER TERMINAL FIXING MEMBER, OPTICAL CONNECTOR, AND OPTICAL FIBER CABLE WITH CONNECTOR

FIELD

The disclosure relates to a fixing member for fixing an optical fiber terminal to a housing, an optical connector which uses the fixing member, and an optical fiber cable with the connector.

BACKGROUND

Along with an increase in the amount of communication of information in a vehicle, such as control signals, image signals, and audio signals, in recent years, transmission paths used for transmission of the information signals have begun using optical fiber cables instead of conventional metal cables (refer to Patent Literatures 1 and 2). Unlike the metal cable, the optical fiber cable is free from a problem of emitting noise therearound due to increase in the communication speed, and thus is a signal transmission path suitable for high-speed and large-capacity information communication.

The optical fiber cable is provided at an end thereof with a removable optical connector. The optical connector includes a terminal (optical fiber terminal) including a ferrule and the like to be attached to the end of the optical fiber cable, and a housing having a structure for being connected to another optical connector or the like. On the other hand, an optical connector is also provided on a device performing communication, and the optical fiber cable can be connected with the device performing communication by connecting the optical connectors to each other. The optical connectors also achieve a connection between optical fiber cables. The connection between optical fiber cables is called wire-to-wire connection.

CITATION LIST

Patent Literatures

Patent Literature 1: Japanese Patent Application Laid-open No. 2002-107573

Patent Literature 2: Japanese Patent No. 3813496

SUMMARY

Technical Problem

When optical fiber cables are applied to wire harnesses in a vehicle, a device performing communication through the wire harnesses is disposed at each component unit of the vehicle, such as a roof portion, a floor portion, an engine and surroundings thereof, and an instrument panel and surroundings thereof. Therefore, among components in the wire harnesses connecting between the communication devices disposed at the respective component units, particularly the optical connector used for the wire-to-wire connection can be repeatedly mounted and dismounted many times, for example, in the assembly process and the mounting process during the vehicle production, and in the inspection and maintenance, and thus can be subjected to strong impacts such as tensions at those occasions. The optical connector is also subjected to vibration, impacts, and the like while the vehicle is running. Accordingly, particularly the optical connectors used in a vehicle are particularly required to be strong against vibration and impact.

Accordingly, there is a need to provide an optical fiber terminal fixing member which can achieve an optical connector that is strong against vibration and impact, and to provide an optical connector which uses the optical fiber terminal fixing member, and an optical fiber cable with the connector.

Solution to Problem

In some embodiments, an optical fiber terminal fixing member is configured to be inserted into an optical connector to fix an optical fiber terminal to a housing. The optical connector includes: the optical fiber terminal attached to an end of an optical fiber cable; and the housing that holds the optical fiber terminal. The optical fiber cable includes: an optical fiber; a tensile member disposed along a longitudinal direction of the optical fiber; and a coating portion that covers the optical fiber and the tensile member. The optical fiber terminal fixing member includes: a main body; a fitting portion formed so as to project from the main body and configured to fit into a groove provided on an outer circumference of the optical fiber terminal; and a fixing structure for fixing the optical fiber terminal fixing member to the housing.

In the optical fiber terminal fixing member, the fixing structure includes a latching pawl configured to engage the optical fiber terminal fixing member with the housing.

In the optical fiber terminal fixing member, a backlash of 0.5 mm to 1.5 mm is provided in the longitudinal direction when the fitting portion is fitted into the groove.

The optical fiber terminal fixing member further includes a spring structure formed so as to project from the main body and configured to be inserted into the groove of the optical fiber terminal to press the optical fiber terminal toward a front end of the optical fiber terminal so as to be stopped against a restricting surface of the housing.

In the optical fiber terminal fixing member, the optical connector includes a plurality of optical fiber terminals arranged in parallel with each other, and the fitting portion and the spring structure of the optical fiber terminal fixing member are configured to be formed corresponding to each of the plurality of optical fiber terminals.

In the optical fiber terminal fixing member, the optical connector includes two optical fiber terminals arranged in parallel with each other, and the spring structure of the optical fiber terminal fixing member is configured to be formed between the two optical fiber terminals to press to stop the two optical fiber terminals.

In some embodiments, an optical connector includes: an optical fiber terminal configured to be attached to an end of an optical fiber cable including an optical fiber, a tensile member disposed along a longitudinal direction of the optical fiber, and a coating portion that covers the optical fiber and the tensile member; a housing that holds the optical fiber terminal; and the optical fiber terminal fixing member that is inserted into the housing to fix the optical fiber terminal to the housing. The housing includes a fixing structure for fixing the optical connector to another optical connector in a removable manner.

In the optical connector, the fixing structure is a latch structure for engaging the optical connector with another optical connector.

In some embodiments, an optical fiber cable with a connector includes: an optical fiber cable including an optical fiber, a tensile member disposed along a longitudinal direction of the optical fiber, and a coating portion that covers the optical fiber and the tensile member; and the optical connector that is attached to an end of the optical fiber cable.

According to some embodiments, because an optical fiber terminal can be firmly fixed to a housing, an optical connector that is strong against vibration and impact can be achieved.

DESCRIPTION OF EMBODIMENTS

A description will be made below in detail of embodiments of an optical fiber terminal fixing member, optical connectors, and an optical fiber cable with connectors according to the present invention, with reference to the accompanying drawings. Note that the present invention is not limited by the embodiments.

In the description given below, an optical fiber terminal used for the optical connectors according to a first embodiment and a second embodiment of the present invention will be described first, and then, the optical connectors according to the first and the second embodiments and an optical fiber terminal fixing member according to a third embodiment used in the optical connectors will be described next.

(Optical Fiber Terminal)

Figure 1:
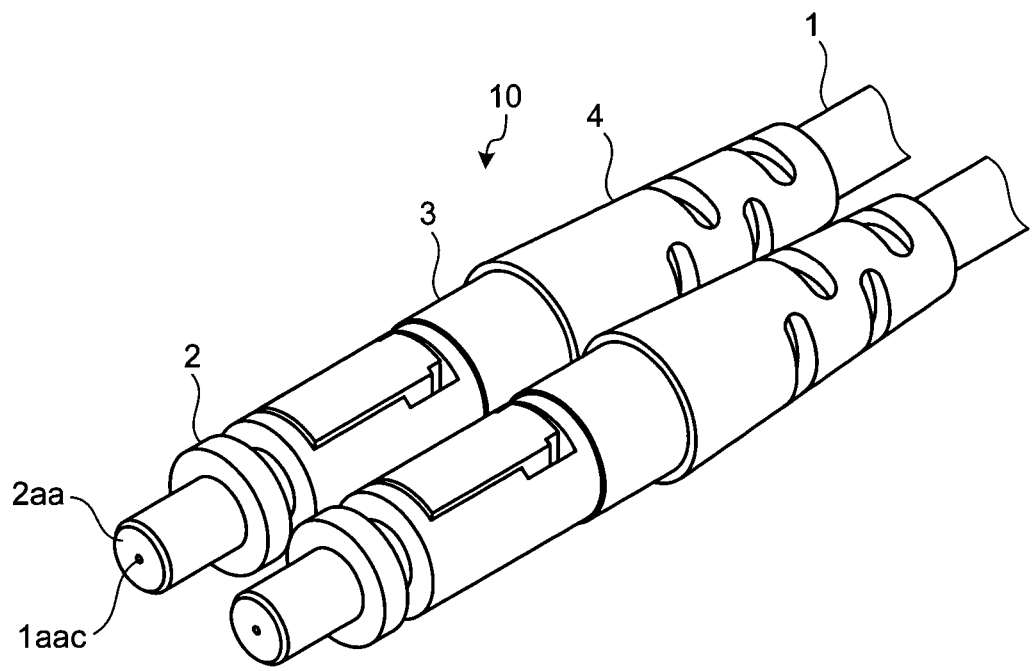
FIG. 1 is a view schematically illustrating an optical fiber cable with terminals in which optical fiber terminals are attached to an end of the optical fiber cable.

FIG. 1 is a view schematically illustrating an optical fiber cable with terminals in which the optical fiber terminals are attached to an end of the optical fiber cable. As illustrated in FIG. 1, optical fiber terminals 10 are attached to respective pieces of the end of a duplex optical fiber cable 1, and provided each with a ferrule 2, a clinching ring 3 serving as a fixing member for a tensile member, and a protection boot 4. The ferrule 2 includes an optical fiber fixing member 2e. The two optical fiber terminals 10 have the same structure as each other, and therefore, one of the optical fiber terminals 10 will be described below.

Figure 2:
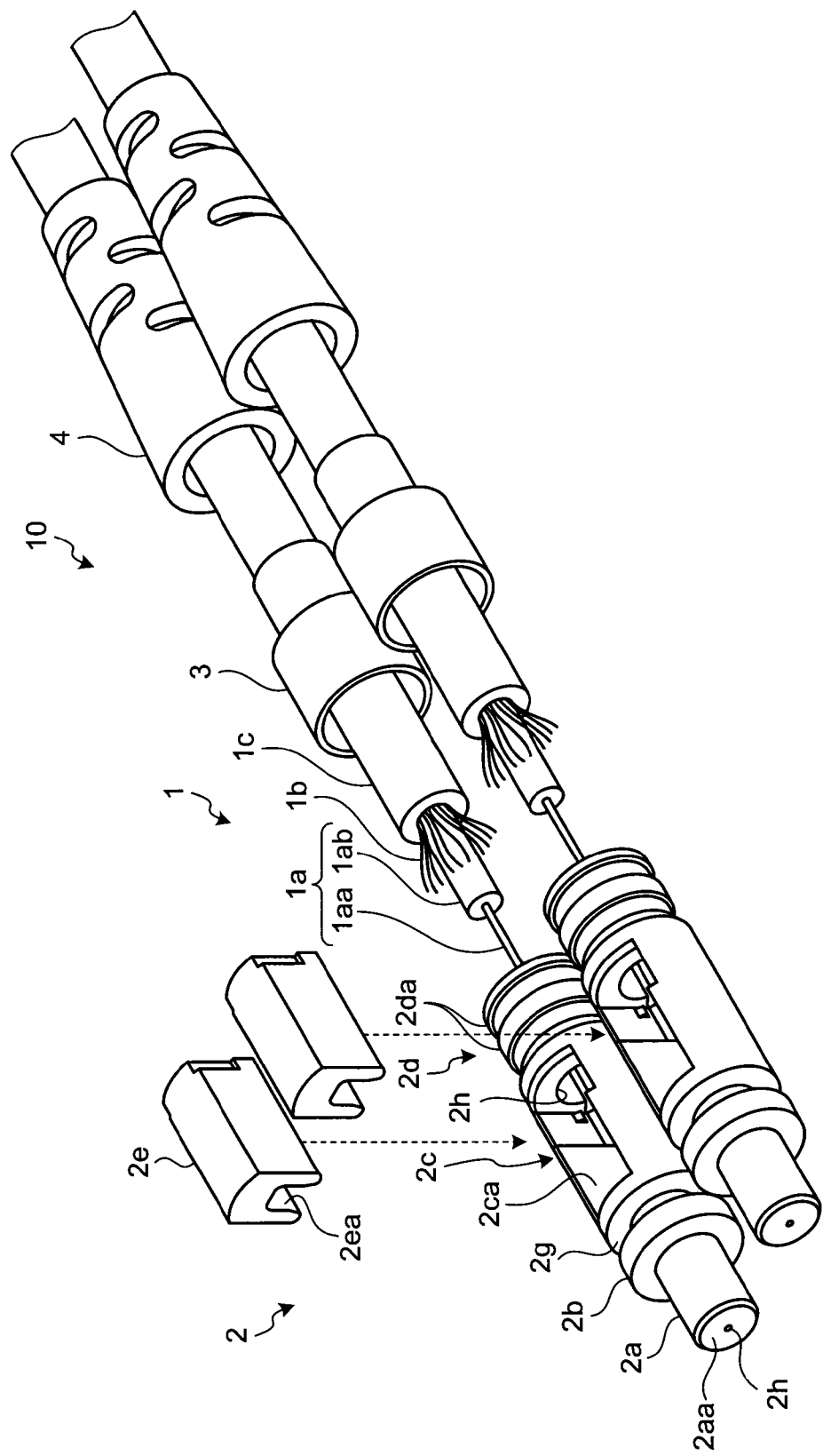
FIG. 2 is a schematic exploded view of the optical fiber cable with terminals illustrated in FIG. 1.

FIG. 2 is a schematic exploded view of the optical fiber cable with terminals illustrated in FIG. 1. As illustrated in FIG. 2, the optical fiber cable 1 includes an optical fiber element wire 1a having an optical fiber 1aa and an element wire coating portion 1ab that is formed along the longitudinal direction of the outer circumference of the optical fiber 1aa to clad the optical fiber 1aa. The optical fiber cable 1 also includes a tensile member 1b disposed along the longitudinal direction of the outer circumference of the optical fiber element wire 1a, and further includes an outer coating portion 1c covering the outer circumference of the tensile member 1b along the longitudinal direction. The tensile member 1b is made of, for example, aramid resin fibers such as Kevlar (registered trademark), and are disposed so as to surround the outer circumference of the optical fiber element wire 1a. The element wire coating portion 1ab is made of, for example, polyamide resin. The element wire coating portion 1ab and the outer coating portion 1c are partially removed at the end of the optical fiber cable 1, and thus, the optical fiber 1aa, the element wire coating portion 1ab, and the tensile member 1b are externally exposed by respective predetermined lengths.

Figure 3:
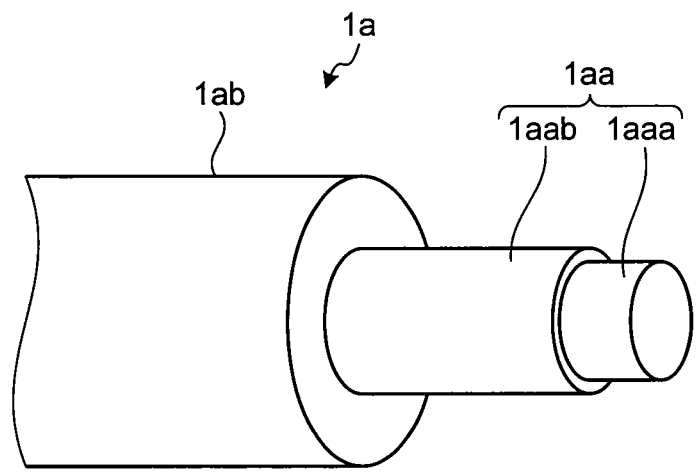
FIG. 3 is a view schematically illustrating a structure of an optical fiber element wire.

FIG. 3 is a view schematically illustrating a structure of the optical fiber element wire 1a. As illustrated in FIG. 3, the optical fiber 1aa is a so-called hard clad silica (HCS) optical fiber that is composed of a core portion 1aaa made of silica based glass and a cladding portion 1aab made of hard plastic having a lower refractive index than that of the core portion 1aaa and formed on the outer circumference of the core portion 1aaa. The core portion 1aaa has a core diameter of, for example, 200 µm, and the cladding portion 1aab has a clad diameter of, for example, 230 µm. The optical fiber 1aa is designed so as to transmit an optical signal of 850 nm at a low loss and over a wide bandwidth, to have a low bending loss, and to be strong against cyclic bending and pulling operations.

Referring back to FIG. 2, the ferrule 2 has a cylindrical shape on the whole, and includes a front end portion 2a, a flange portion 2b provided along the outer circumference, a main body 2c, a base portion 2d, and the optical fiber fixing member 2e. The ferrule 2 is made of, for example, polyphenylene sulfide (PPS) resin excelling in thermal resistance, mechanical strength, and moldability. The front end portion 2a has a front end face 2aa. The base portion 2d is located at an end on the opposite side of the front end face 2aa, and provided along the outer circumference thereof with projecting portions $2da$, thus having a corrugated surface. A groove portion $2g$ is formed along the outer circumference between the main body $2c$ and the flange portion $2b$. The ferrule 2 is also formed with an insertion hole $2h$ for inserting the end of the optical fiber cable 1 therein so that the insertion hole penetrates from the front end face $2aa$ to the base portion $2d$. The diameter of the insertion hole $2h$ is set to substantially equal to or slightly larger than the outside diameter of the optical fiber $1aa$ at the front end portion $2a$, and set to substantially equal to or slightly larger than the outside diameter of the optical fiber element wire $1a$ at other portions (except at an open hole $2ca$ to be described later).

The optical fiber fixing member $2e$ has a gutter-like shape, and includes a groove $2ea$ for holding the optical fiber element wire $1a$. The main body $2c$ of the ferrule 2 is formed on a side face thereof with the open hole $2ca$ for inserting the optical fiber fixing member $2e$ therein. The open hole $2ca$ has a shape that allows inner walls of the open hole $2ca$ to come contact with outer walls of the optical fiber fixing member $2e$ substantially without a space therebetween when the optical fiber fixing member $2e$ is inserted. In addition, the open hole $2ca$ is communicated with the insertion hole $2h$, and is formed to a depth allowing a portion of the element wire coating portion $1ab$ of the optical fiber cable 1 inserted in the ferrule 2 to be exposed. A structure of the open hole $2ca$ of the ferrule 2 will be described later in detail. When the widths of the top of the optical fiber fixing member $2e$ and the bottom of the groove $2ea$ are designed to have sizes allowing the optical fiber fixing member $2e$, when being set on the optical fiber, to project from the circumference around a front end face $2ba$ of the flange portion $2b$ of the optical fiber terminal 10 by about 0.1 mm to about 1 mm, a pressing force obtained by inserting the optical fiber terminal 10 into a housing 21 (to be described later) strengthens the fixing of the optical fiber $1aa$ and provides a resistance against tension.

A description will be made next of a method for attaching the optical fiber terminal 10 to the end of the optical fiber cable 1. First, the optical fiber cable 1 is sequentially inserted through the protection boot 4 and the clinching ring 3. Next, the outer coating portion $1c$ and the element wire coating portion $1ab$ at the end of the optical fiber cable 1 are partially removed to externally expose the optical fiber $1aa$, the element wire coating portion $1ab$, and the tensile member $1b$ by the respective predetermined lengths.

Then, the end of the optical fiber cable 1 is inserted from the side of the base portion $2d$ into the insertion hole $2h$ of the ferrule 2. At this time, the optical fiber cable 1 is inserted so that a front end face $1aac$ (refer to FIG. 1) of the optical fiber $1aa$ inserted in the insertion hole $2h$ is coplanar with the front end face $2aa$ of the ferrule 2. Then, the element wire coating portion $1ab$ of the optical fiber element wire $1a$ results to be located in the position of the open hole $2ca$.

Figure 4:
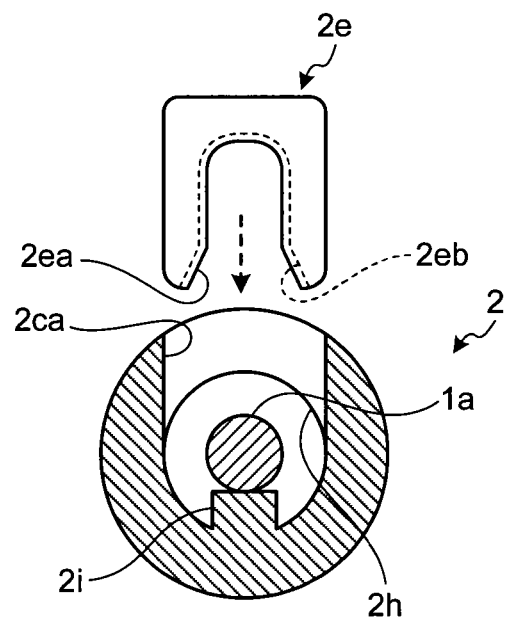
FIG. 4 is a cross-sectional view for explaining a state of inserting an optical fiber fixing member into a ferrule.

Next, the optical fiber fixing member $2e$ is inserted into the open hole $2ca$ so as to hold the optical fiber element wire $1a$ and thus to fix the optical fiber element wire $1a$ to the ferrule 2. FIG. 4 is a cross-sectional view in a plane perpendicular to the longitudinal direction of the ferrule 2 for explaining the state of inserting the optical fiber fixing member $2e$ into the ferrule 2. As illustrated in FIG. 4, a support base $2i$ is provided on a bottom surface of the open hole $2ca$ of the ferrule 2 along the insertion direction of the optical fiber element wire $1a$, and the optical fiber element wire $1a$, when inserted, is supported by the support base $2i$.

The optical fiber fixing member $2e$ is inserted into the open hole $2ca$, and thus, the optical fiber element wire $1a$ is held by the groove $2ea$. The groove $2ea$ is formed inside thereof with a corrugated portion $2eb$. Therefore, when the optical fiber fixing member $2e$ holds the optical fiber element wire $1a$ with the groove $2ea$, the frictional force increases between the groove $2ea$ and the optical fiber element wire $1a$. In addition, the optical fiber fixing member $2e$, when inserted in the open hole $2ca$, is pressed to be in contact with the ferrule 2 because the inner walls of the open hole $2ca$ are in contact with the outer walls of the optical fiber fixing member $2e$ substantially without a space therebetween, as described above. The optical fiber fixing member $2e$ fixes the optical fiber element wire $1a$ to the ferrule 2 with the frictional force and the pressure described above. By fixing the optical fiber element wire $1a$ to the ferrule 2 using the optical fiber fixing member $2e$ such as described above, the attaching operation can be continued, for example, without waiting for adhesive to be solidified in the case of fixing the optical fiber element wire $1a$ with the adhesive. Thus, the time for the working process can be shortened.

Next, the tensile member $1b$ is placed on the base portion $2d$ of the ferrule 2. At this time, it is preferable to place the tensile member $1b$ uniformly over the outer circumference of the base portion $2d$. Then, the clinching ring 3 is fitted onto the base portion $2d$, and the base portion $2d$ is crimped by the clinching ring 3 together with the tensile member $1b$ placed on the base portion $2d$. Thereafter, the protection boot 4 is mounted on the clinching ring 3. Thus, the optical fiber terminals 10 are attached to the optical fiber cable 1 to produce the optical fiber cable with terminals. The protection boot 4 is made of, for example, rubber or elastic plastic, and prevents a joint portion between the optical fiber terminal 10 and the optical fiber cable 1 from bending to a smaller bending radius than an allowable radius, thereby preventing the optical fiber element wire $1a$ from breaking.

Here, in the optical fiber terminal 10, the clinching ring 3 fixes the tensile member $1b$ to the ferrule 2, and thus, the tensile member $1b$ is fixed to the ferrule 2 to be integrated therewith. Therefore, a strong structure against vibration and impact is obtained.

Figure 5:
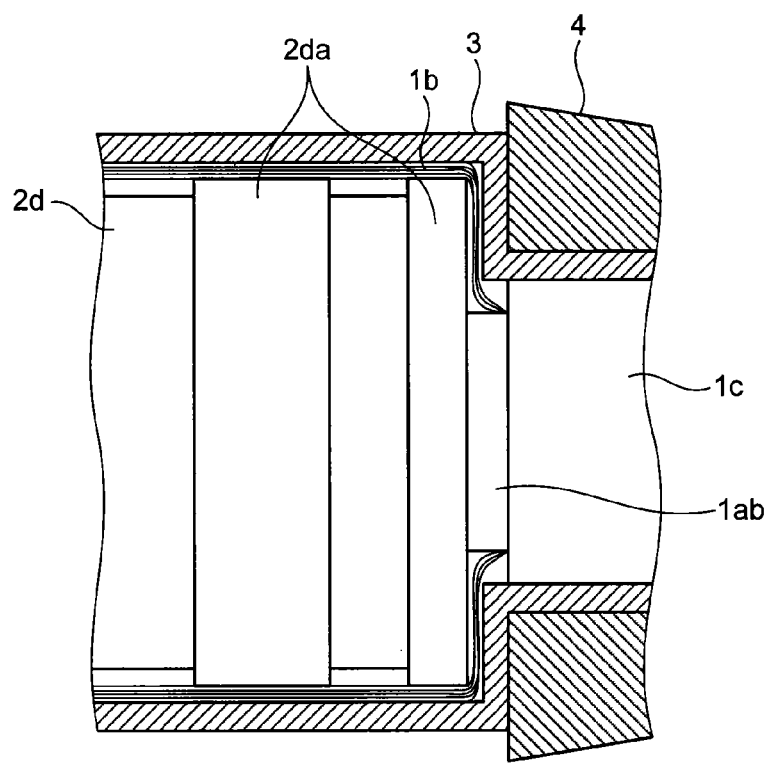
FIG. 5 is a partial cross-sectional view for explaining a state in which a tensile member is fixed.

FIG. 5 is a partial cross-sectional view for explaining the state in which the tensile member $1b$ is fixed. As illustrated in FIG. 5, the tensile member $1b$ is directly fixed to the base portion $2d$ of the ferrule 2 by the clinching ring 3. For this reason, the optical fiber cable 1 and the optical fiber terminal 10 are integrated with each other at the joint portion therebetween, and thus are prevented from easily separating from each other even when the optical fiber cable 1 is pulled due to vibration or impact. Therefore, the optical fiber terminal 10 is strengthened against vibration and impact. The base portion $2d$ includes the projecting portions $2da$ along the outer circumference, and thus, projections and recesses are formed on the surface of the base portion $2d$. Consequently, after being clinched by the clinching ring 3, the tensile member $1b$, when pulled, is caught on the projecting portions $2da$ to be prevented from being easily pulled out, and thus is further strengthened against tension.

In addition, in the optical fiber terminal 10, the optical fiber element wire $1a$ is fixed to the ferrule 2 using the optical fiber fixing member $2e$. Accordingly, the optical fiber terminal 10 is further firmly connected with the optical fiber cable 1, and thus is further strengthened against vibration and impact.

As has been described above, the optical fiber terminal 10 hardly separates from the optical fiber cable 1 even when the optical fiber cable 1 is pulled due to vibration or impact. Thus, the optical fiber terminal 10 is strong against vibration and impact, and can endure a tensile force of, for example, as large as 100 N.

(First to Third Embodiments)

Figure 6:
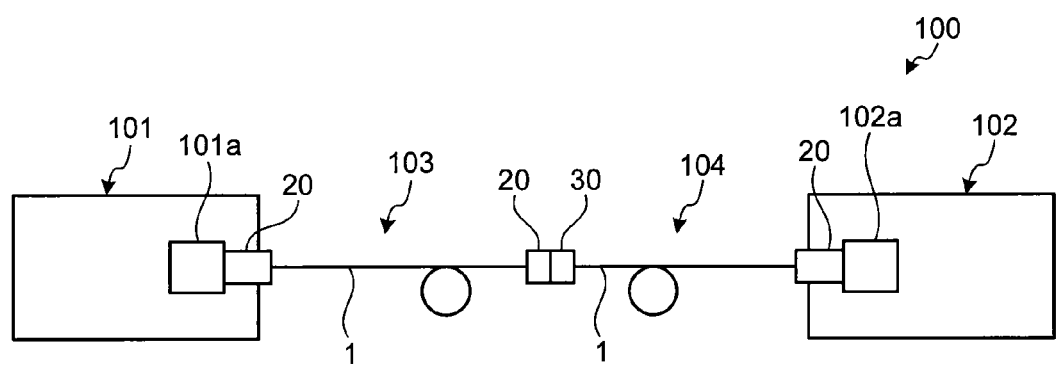
FIG. 6 is a view schematically illustrating a state in which optical connectors according to a first embodiment and a second embodiment are used.

A description will be made next of the optical connectors according to the first and the second embodiments of the present invention, and of the optical fiber terminal fixing member according to the third embodiment used in the optical connectors. FIG. 6 is a view schematically illustrating a state in which the optical connectors according to the first and the second embodiments are used. FIG. 6 illustrates an in-vehicle communication system 100. In this in-vehicle communication system 100, a control board 101 and a control board 102 provided in devices performing communication are connected to each other through optical fiber cables 103 and 104 with connectors, and perform mutual transmission of control signals.

The control boards 101 and 102 are respectively equipped with fiber optical transceivers (FOTs) 101a and 102a, each of which has a female connector structure. The optical fiber cable 103 with connectors is a cable in which male optical connectors 20 according to the first embodiment are attached to both ends of the optical fiber cable 1 illustrated in FIG. 2. The optical fiber cable 104 with connectors is a cable in which the optical connector 20 and a female optical connector 30 according to the second embodiment are attached to the respective ends of the optical fiber cable 1. The optical connectors 20 of the optical fiber cables 103 and 104 with connectors are connected to the FOTs 101a and 102a, respectively, while the other optical connector 20 of the optical fiber cable 103 with connectors is connected (that is, connected wire-to-wire) to the optical connector 30 of the optical fiber cable 104 with connectors. Accordingly, a signal transmission path is formed by the optical fiber cables 103 and 104 with connectors between the control boards 101 and 102, and thus, high-speed and large-capacity communication is enabled.

Figure 7A:
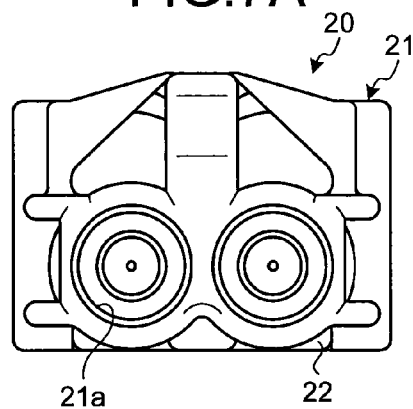
FIG. 7A is a front view schematically illustrating an optical fiber cable with connectors in which the optical connector according to the first embodiment is attached to an end of the optical fiber cable.
Figure 7B:
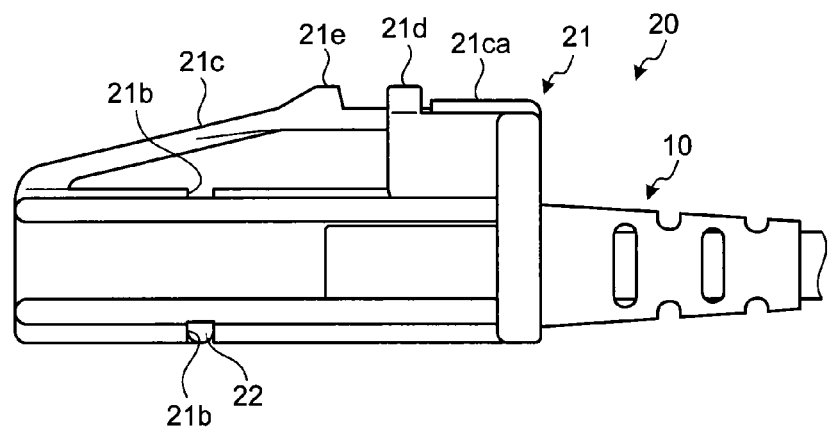
FIG. 7B is a side view schematically illustrating the optical fiber cable with connectors in which the optical connector according to the first embodiment is attached to the end of the optical fiber cable.
Figure 7C:
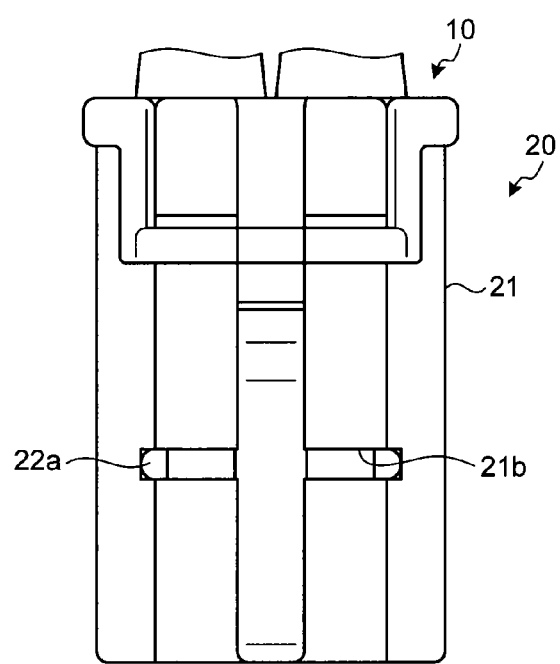
FIG. 7C is a plan view schematically illustrating the optical fiber cable with connectors in which the optical connector according to the first embodiment is attached to the end of the optical fiber cable.
Figure 8:
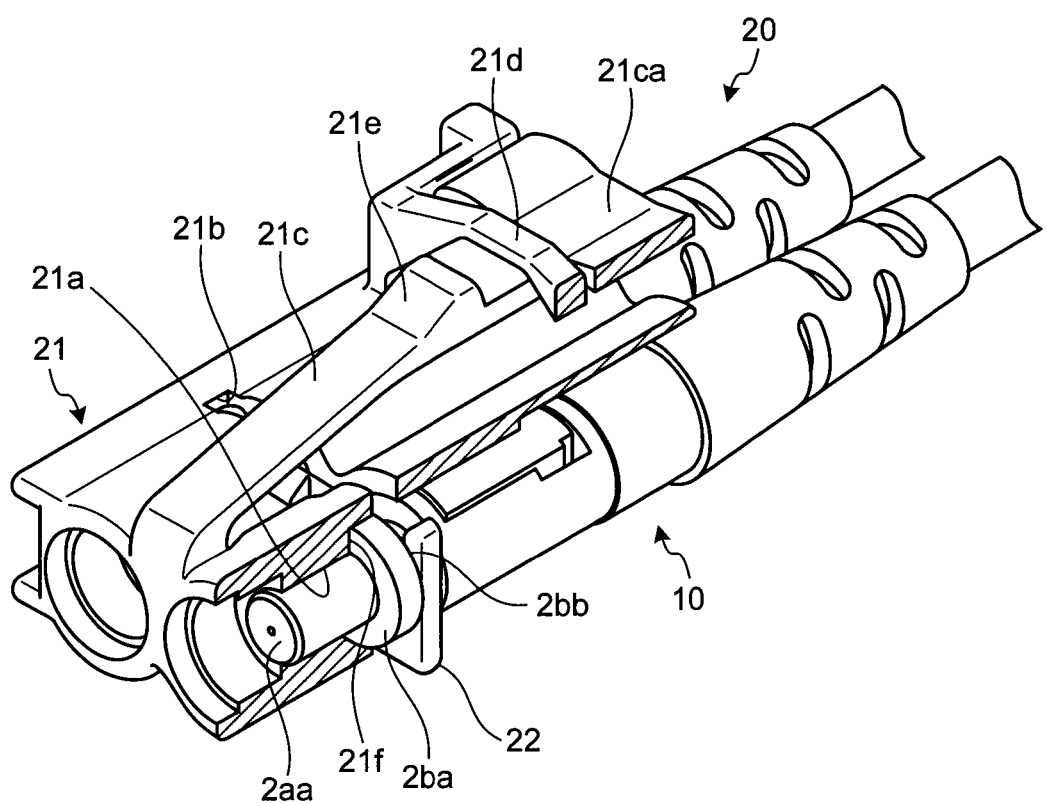
FIG. 8 is a partial cross-sectional view of the optical connector illustrated in FIGS. 7A to 7C.

Next, the optical connector according to the first embodiment will be specifically described. FIGS. 7A, 7B, and 7C are front, side, and plan views, respectively, schematically illustrating the optical fiber cable with connectors in which the optical connector according to the first embodiment is attached to the end of the optical fiber cable. FIG. 8 is a partial cross-sectional view of the optical connector illustrated in FIGS. 7A to 7C.

As illustrated in FIGS. 7A to 7c and 8, the optical connector 20 includes the optical fiber terminals 10 illustrated in FIG. 1, the housing 21 for holding the optical fiber terminals 10, and an optical fiber terminal fixing member 22 according to the third embodiment for fixing the optical fiber terminals 10 to the housing 21.

The housing 21 includes two insertion holes 21a formed in parallel with each other in the longitudinal direction for inserting therein the two optical fiber terminals 10 attached to the respective ends of the duplex optical fiber cable 1; a slit 21b formed so as to penetrate from a top surface to a bottom surface of the housing 21 and so as to communicate with the insertion holes 21a in order to insert therein the optical fiber terminal fixing member 22; an elastic arm portion 21c formed so as to slant obliquely upward from the front end to the rear end in the longitudinal direction in the substantially middle in the width direction; a hook portion 21d for hooking and stopping a front end portion 21ca of the arm portion 21c; and a latch projection 21e formed on an upper portion of the arm portion 21c. An inner wall of the insertion hole 21a is provided with a restricting surface 21f that abuts against the front end face 2ba of the flange portion 2b of the optical fiber terminal 10 to restrict the optical fiber terminal 10 from moving toward the side of the front end face thereof. The housing 21 is made of, for example, PPS or polybutylene terephthalate (PBT).

Figure 9A:
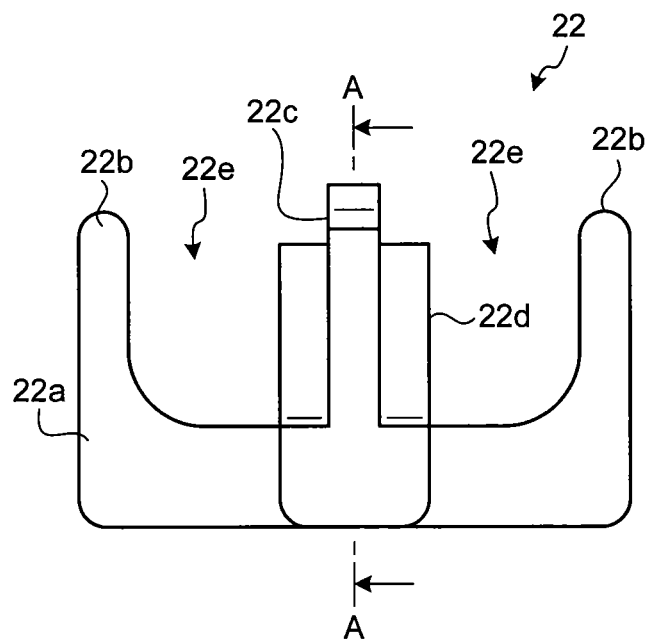
FIG. 9A is a front view schematically illustrating a structure of an optical fiber terminal fixing member according to a third embodiment.
Figure 9B:
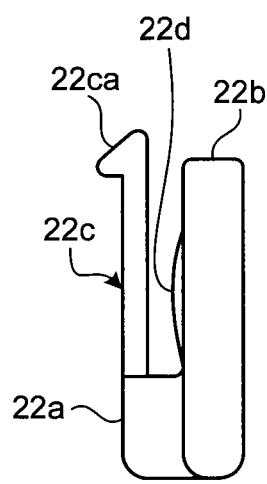
FIG. 9B is a side view schematically illustrating the structure of the optical fiber terminal fixing member according to the third embodiment.
Figure 9C:
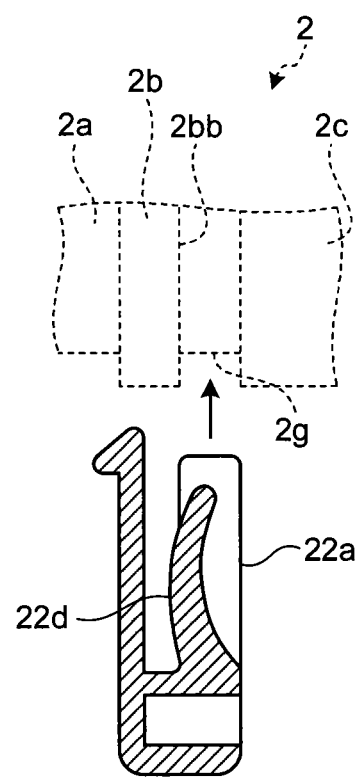
FIG. 9C is a view illustrating a cross section taken along line A-A in FIG. 9A and a state in which the optical fiber terminal fixing member fixes the optical fiber terminal.

FIGS. 9A and 9B are front and side views, respectively, schematically illustrating a structure of the optical fiber terminal fixing member according to the third embodiment illustrated in FIGS. 7A to 7C. FIG. 9C is a view illustrating a cross section taken along line A-A in FIG. 9A and a state in which the optical fiber terminal fixing member fixes the optical fiber terminal. As illustrated in FIGS. 9A to 9C, the optical fiber terminal fixing member 22 includes a main body 22a, fitting portions 22b formed so as to project from both ends in the width direction of the main body 22a, a latch portion 22c formed so as to project from the substantially middle in the width direction of the main body 22a, and a spring portion 22d. Two gaps 22e are formed between the fitting portions 22b and both the latch portion 22c and the spring portion 22d. The optical fiber terminal fixing member 22 is made of, for example, PPS or PBT.

The thickness of the fitting portions 22b is set to substantially equal to or slightly smaller than the width of the groove portion 2g of the ferrule 2. The latch portion 22c is provided slightly on the front side of the fitting portions 22b, and provided at a front end thereof with a latching pawl 22ca. As illustrated in FIGS. 9B and 9C, when viewed from the side, the spring portion 22d is curved in a circular arc shape so as to project toward the latch portion 22c, and formed so that the arc-shaped portion projects higher than the surface of the fitting portion 22b on the side of the latch portion 22c. In the present embodiment, the width of the fitting portions 22b and the width of the groove portion 2g are designed to have almost the same size. However, when the width of the groove portion 2g is set to be larger than that of the fitting portions 22b by 0.5 mm to 1.5 mm so that the spring portion 22d applies pressure, a tensile force applied to the optical fiber cable 1 is absorbed by the spring so as to be prevented from acting instantaneously on the housing 21, and thus, the housing 21 can be effectively prevented from breaking.

Next, a method for assembling the optical connector 20 will be described. First, as illustrated in FIG. 8, the two optical fiber terminals 10 are inserted into the insertion holes 21a of the housing 21 so that the front end faces 2ba of the flange portions 2b of the ferrules 2 abut against the restricting surfaces 21f in the insertion holes 21a. At this time, the groove portions 2g of the ferrules 2 are located so as to overlap with the slit 21b formed in the housing 21.

Then, the optical fiber terminal fixing member 22 is inserted from the bottom side of the housing 21 into the slit 21b. As a result, as illustrated in FIG. 9C, the two fitting portions 22b of the optical fiber terminal fixing member 22 are inserted into the two respective outside groove portions 2g of the two ferrules 2. The front ends of the fitting portions 22b reach the slit 21b in the top surface and are inserted therein. Accordingly, the optical fiber terminal fixing member 22 is restricted from moving in the longitudinal direction by the slit 21b in the top and bottom surfaces.

The spring portion 22d is inserted into each of the two groove portions 2g of the ferrules 2 in the state in which the curved portion is pressed backward by the flange portion 2b. As a result, the spring portion 22d presses a rear end face 2bb of the flange portion 2b, and thus, the front end face 2ba of the flange portion 2b is pressed by the restricting surface 21f of the housing 21 toward the front end face 2aa of the ferrule 2. Accordingly, the ferrule 2 is pressed and stopped by the restricting surface 21f of the housing 21. The latch portion 22c passes between the two ferrules 2, and the latching pawl 22ca is engaged into the slit 21b in the top surface of the housing 21. Accordingly, the optical fiber terminal fixing member 22 is fixed to the housing 21. The two ferrules 2 are disposed in the two gaps 22e.

As described above, the fitting portions 22b of the optical fiber terminal fixing member 22 according to the third embodiment fit in the groove portions 2g of the ferrules 2, and the optical fiber terminal fixing member 22 also fits in the slit 21b. Accordingly, the optical fiber terminals 10 are firmly fixed to the housing 21, and thus, the optical connector 20 is further strengthened against vibration and impact. Therefore, the optical connector 20 can endure a tensile force of, for example, as large as 100 N, and has high connection reliability. In addition, in the first embodiment, the optical fiber terminal fixing member 22 uses the spring portion 22d to press the optical fiber terminal 10 to be stopped against the restricting surface 21f of the housing 21, and thus, the optical fiber terminal 10 is further restricted from moving toward the front end face thereof. Accordingly, the front end face 2aa of the optical fiber terminal 10 can be set in a desired position.

Figure 10A:
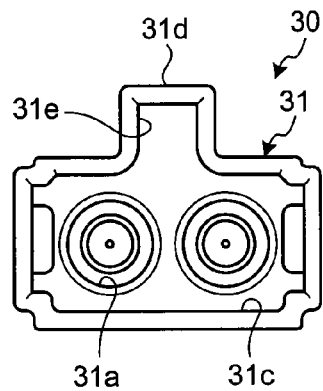
FIG. 10A is a front view schematically illustrating an optical fiber cable with connectors in which the optical connector according to the second embodiment is attached to an end of the optical fiber cable.
Figure 10B:
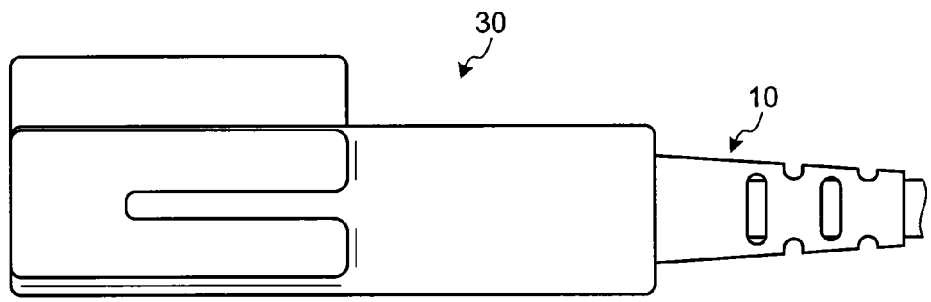
FIG. 10B is a side view schematically illustrating the optical fiber cable with connectors in which the optical connector according to the second embodiment is attached to the end of the optical fiber cable.
Figure 10C:
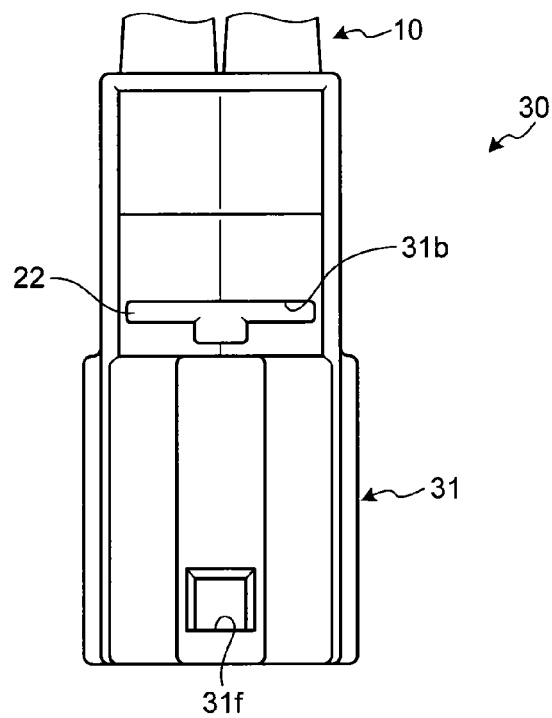
FIG. 10C is a plan view schematically illustrating the optical fiber cable with connectors in which the optical connector according to the second embodiment is attached to the end of the optical fiber cable.
Figure 11:
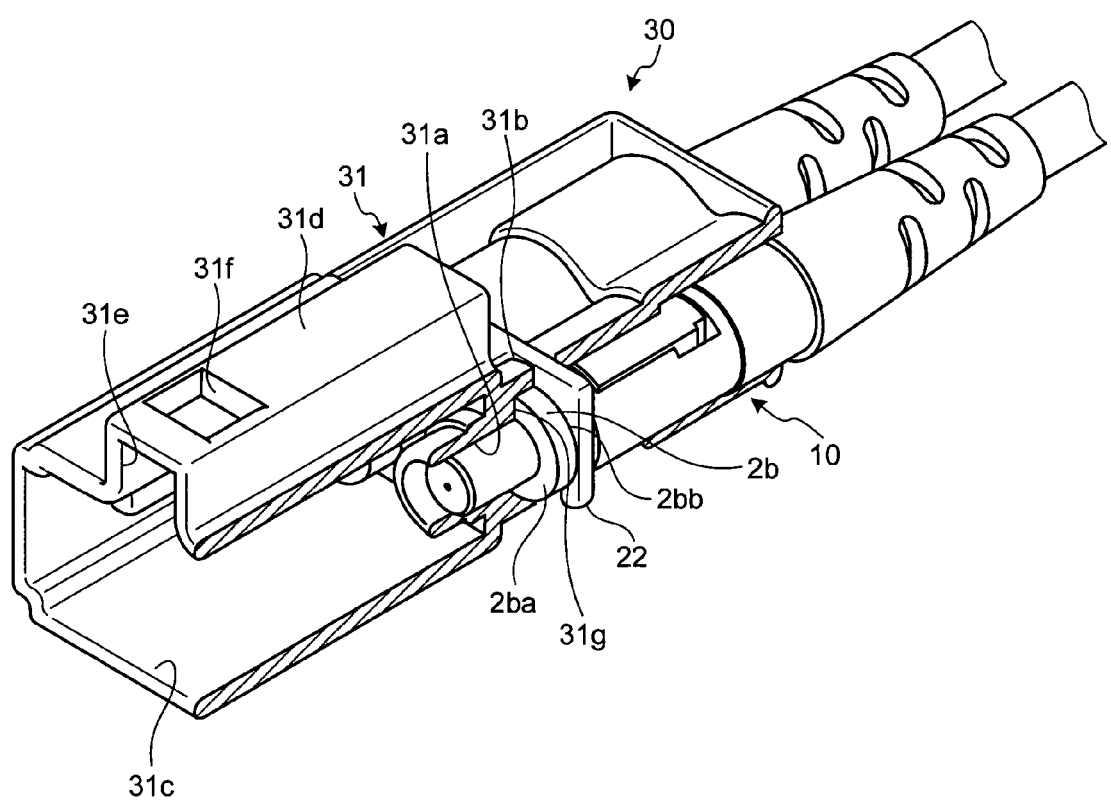
FIG. 11 is a partial cross-sectional view of the optical connector illustrated in FIGS. 10A to 10C.

Next, the optical connector according to the second embodiment will be specifically described. FIGS. 10A, 10B, and 10C are front, side, and plan views, respectively, schematically illustrating the optical fiber cable with connectors in which the optical connector according to the second embodiment is attached to the end of the optical fiber cable. FIG. 11 is a partial cross-sectional view of the optical connector illustrated in FIGS. 10A to 10C.

As illustrated in FIGS. 10A to 10C and 11, the optical connector 30 includes the optical fiber terminals 10 illustrated in FIG. 1, a housing 31 for holding the optical fiber terminals 10, and the optical fiber terminal fixing member 22 according to the third embodiment for fixing the optical fiber terminals 10 to the housing 31.

The housing 31 includes two insertion holes 31a formed in parallel with each other in the longitudinal direction for inserting therein the two optical fiber terminals 10 attached to the respective ends of the duplex optical fiber cable 1; a slit 31b formed so as to penetrate from a bottom surface to a top surface of the housing 31 and so as to communicate with the insertion holes 31a in order to insert therein the optical fiber terminal fixing member 22; and a receptacle 31c that communicates toward the front end thereof from the insertion holes 31a to house the optical connector 20 according to the second embodiment inserted therein. The top surface of the housing 31 is formed with a projection 31d. The projection 31d is formed inside thereof with a guide groove 31e, in a continuous manner with the receptacle 31c, through which the arm portion 21c is guided when the optical connector 20 is inserted. The projection 31d is formed with a latch hole 31f serving as a fixing structure for receiving the latch projection 21e fitted therein. An inner wall of the insertion hole 31a is provided with a restricting surface 31g that abuts against the front end face 2ba of the flange portion 2b of the optical fiber terminal 10 to restrict the optical fiber terminal 10 from moving forward. The housing 31 is made of, for example, PPS.

Next, a method for assembling the optical connector 30 will be described. First, as illustrated in FIG. 11, the two optical fiber terminals 10 are inserted into the insertion holes 31a of the housing 31 so that the front end faces 2ba of the flange portions 2b of the ferrules 2 abut against the restricting surfaces 31g in the insertion holes 31a. At this time, the groove portions 2g of the ferrules 2 are located so as to overlap with the slit 31b formed in the housing 31.

Then, the optical fiber terminal fixing member 22 is inserted from the top of the housing 31 into the slit (insertion hole) 31b. As a result, in the same manner as in the case of the optical connector 20, the two fitting portions 22b of the optical fiber terminal fixing member 22 are inserted into the two respective outside groove portions 2g of the two ferrules 2. The front ends of the fitting portions 22b reach the slit 21b on the bottom surface side and are inserted therein. Accordingly, the optical fiber terminal fixing member 22 is restricted from moving in the longitudinal direction by the slit 31b in the top and bottom surfaces.

The spring portion 22d is inserted into each of the two groove portions 2g of the ferrules 2 in the state in which the curved portion is pressed backward by the flange portion 2b. As a result, the spring portion 22d presses the rear end face 2bb of the flange portion 2b, and thus, the front end face 2ba of the flange portion 2b is pressed by the restricting surface 31g of the housing 31 toward the front end face 2aa of the ferrule 2. Accordingly, the ferrule 2 is pressed and stopped by the restricting surface 31g of the housing 31. The latch portion 22c passes between the two ferrules 2, and the latching pawl 22ca is engaged into the slit 31b in the bottom surface of the housing 31. Accordingly, the optical fiber terminal fixing member 22 is fixed to the housing 31. The two ferrules 2 are disposed in the two respective gaps 22e.

As described above, the fitting portions 22b of the optical fiber terminal fixing member 22 according to the third embodiment fit in the groove portions 2g of the ferrules 2, and the optical fiber terminal fixing member 22 also fits in the slit 31b. Accordingly, the optical fiber terminals 10 are firmly fixed to the housing 31, and thus, the optical connector 30 is further strengthened against vibration and impact. Therefore, the optical connector 30 can endure a tensile force of, for example, as large as 100 N, and has high connection reliability. After the optical fiber terminals 10 are inserted into the housing 31, the optical fiber terminals 10 can be positioned from outside of the housing 31 by using the optical fiber terminal fixing member 22. In addition, in the second embodiment, the optical fiber terminal fixing member 22 uses the spring portion 22d to press the optical fiber terminal 10 to be stopped against the restricting surface 31g of the housing 31, and thus, the optical fiber terminal 10 is further restricted from moving toward the front end face thereof. Accordingly, the front end face 2aa of the optical fiber terminal 10 can be set in a desired position.

Figure 12:
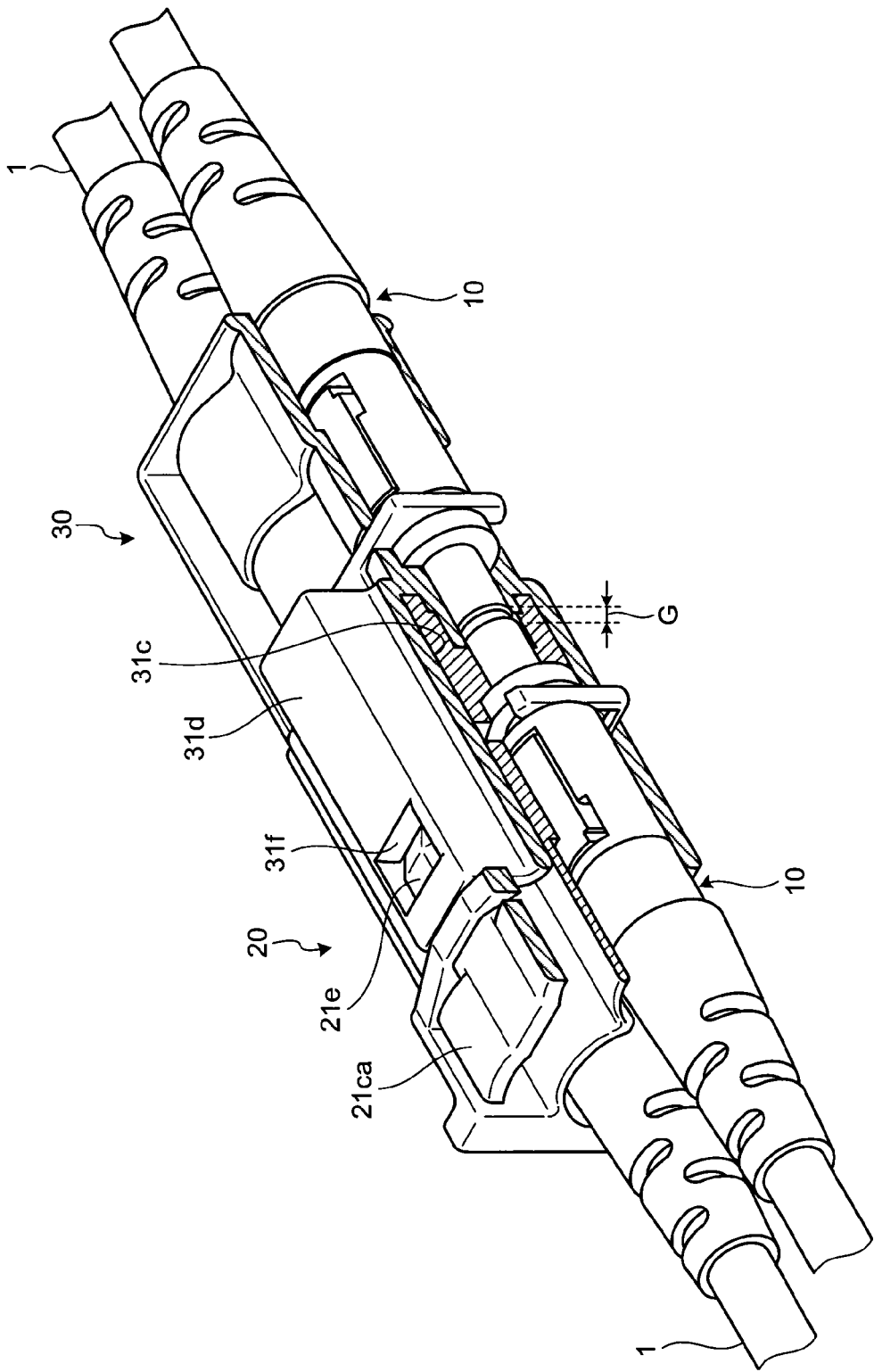
FIG. 12 is a partial cross-sectional view illustrating a state in which the optical connector illustrated in FIGS. 7A to 7C is connected with the optical connector illustrated in FIGS. 10A to 10C.

FIG. 12 is a partial cross-sectional view illustrating a state in which the optical connector 20 according to the first embodiment illustrated in FIGS. 7A to 7C is connected with the optical connector 30 according to the second embodiment illustrated in FIGS. 10A to 10C. When the optical connector 20 is to be connected with the optical connector 30, the optical connector 20 is inserted into the receptacle 31c of the optical connector 30. As a result, the arm portion 21c of the optical connector 20 is guided by the guide groove 31e, and the latch projection 21e fits into the latch hole 31f and is engaged therein. Accordingly, the optical connector 20 is connected with the optical connector 30. When the connection is to be released, the front end portion 21ca of the arm portion 21c of the optical connector 20 is pressed down, and the latch projection 21e and the latch hole 31f are disengaged from each other. Thus, the connection can be released.

When the optical connector 20 is connected with the optical connector 30, a gap G having a predetermined width is formed between the front end faces 2aa of the optical fiber terminals 10 opposed to each other. Because the gap G is formed in this manner, the front end faces 1aac of the optical fibers 1aa lying in the same planes as the corresponding front end faces 2aa of the optical fiber terminals 10 do not rub each other even if, for example, the optical fiber terminals 10 are shaken due to vibration or impact, or the optical connector 20 and the optical connector 30 are repeatedly mounted and dismounted in the production and maintenance processes or the like. Therefore, the front end face 1aac is prevented from being broken or flawed.

The width of the gap G is set to, for example, 500 μm or less, and preferably 30 to 300 μm, and is set so that the optical fiber cables 1 are connected to each other at a low optical loss depending on the core diameter and the numerical aperture of the optical fiber 1aa, pistoning of the optical fiber 1aa, and the like. In each of the optical connectors 20 and 30 according to the present embodiments, the optical fiber terminal 10 is ensured to be restricted from moving toward the front end thereof by the optical fiber terminal fixing member 22 and by the flange portion 2b and the restricting surface 21f or 31g of the optical fiber terminal 10, and thus, the gap G is maintained even when vibration or impact is applied to the optical connectors 20 and 30 connected to each other. Therefore, the front end faces 2aa of the optical fiber terminals 10 do not come in contact with each other, and thus, the front end face 1aac of the optical fiber 1aa is prevented from being broken or flawed.

While the above-described embodiments use the optical fiber cable that includes resin fibers as the tensile member, the optical fiber cable can use wire-like tensile member made of, for example, metal or FRP.

While the above-described embodiments use the optical fiber fixing member to fix the optical fiber to the ferrule, the optical fiber can be bonded to be fixed to the ferrule.

If dust or dirt enters the optical connector according to any of the above-described embodiments when the optical connector is mounted or dismounted, an optical connection loss of the optical connector could increase. Therefore, it is preferable to provide a dust-proof structure such as a cover made of rubber in the optical connector.

While the above-described embodiments apply the optical fiber terminal and the optical connector of the present invention to the duplex optical fiber cable, the present invention is not limited thereto but can also be applied to a simplex optical fiber cable or a multiplex optical fiber cable including three or more cables.

While the above-described embodiments provide the fixing place by the optical fiber fixing member at one location of the optical fiber terminal, such a fixing place can be provided at each of a plurality of locations, such as at the other end side of a connection end face of the optical connector.

While a resin material such as PPS can be used as material of the optical fiber fixing member 2e, a metal such as iron, aluminum, or stainless steel can also be used.

If being used in a portion to which not much tension is applied, the fitting portions can use members that are resilient although having less impact resistance, and can be pressed against the end face. Moreover, the fitting portions can use members that are elastically deformable in either longitudinal direction, and a slight distance can be provided between the housing and the front end face of the flange portion of the optical fiber terminal. As a result, the fitting portions fitted in the grooves of the optical fiber terminal can be designed to allow the optical fiber terminal to move forward and backward in the longitudinal direction.

The present invention is not limited by the above-described embodiments. The present invention also includes structures obtained by appropriately combining the component parts described above. Further effects and variations can be easily derived by those skilled in the art. Therefore, wider aspects of the present invention are not limited to the above described embodiments, and various modifications are possible.

INDUSTRIAL APPLICABILITY

As described above, the optical fiber terminal fixing member, the optical connector, and the optical fiber cable with the connector according to the present invention are preferably used mainly for applications in information communication in a vehicle.

REFERENCE SIGNS LIST

1 OPTICAL FIBER CABLE
1a OPTICAL FIBER ELEMENT WIRE
1aa OPTICAL FIBER
1aaa CORE PORTION
1aab CLADDING PORTION
1aac FRONT END FACE
1ab ELEMENT WIRE COATING PORTION
1b TENSILE MEMBER
1c OUTER COATING PORTION
2 FERRULE
2a FRONT END PORTION
2aa FRONT END FACE
2b FLANGE PORTION
2ba FRONT END FACE
2bb REAR END FACE
2c MAIN BODY
2eb CORRUGATED PORTION
2ca OPEN HOLE
2d BASE PORTION
2da PROJECTING PORTION
2e OPTICAL FIBER FIXING MEMBER
2ea GROOVE
2g GROOVE PORTION
2h, 21a, 31a INSERTION HOLE
2i SUPPORT BASE
3 CLINCHING RING
4 PROTECTION BOOT
10 OPTICAL FIBER TERMINAL
20, 30 OPTICAL CONNECTOR
21, 31 HOUSING
21b, 31b SLIT
21c ARM PORTION
21ca FRONT END PORTION
21d HOOK PORTION
21e LATCH PROJECTION
21f, 31g RESTRICTING SURFACE
22 OPTICAL FIBER TERMINAL FIXING MEMBER
22a MAIN BODY
22b FITTING PORTION
22c LATCH PORTION
22ca LATCHING PAWL
22d SPRING PORTION
22e GAP
31c RECEPTACLE
31d PROJECTION
31e GUIDE GROOVE
31f LATCH HOLE
100 IN-VEHICLE COMMUNICATION SYSTEM
101, 102 CONTROL BOARD
103, 104 OPTICAL FIBER CABLE WITH CONNECTORS
G GAP

The invention claimed is:

1. An optical fiber terminal fixing member configured to be inserted into an optical connector to fix two optical fiber terminals to a housing,
   the optical connector comprising:
      the two optical fiber terminals attached to each end of two optical fiber cables; and
      the housing that holds the two optical fiber terminals,
   each of the two optical fiber cables comprising:

an optical fiber;

a tensile member disposed along a longitudinal direction of the optical fiber; and a coating portion that covers the optical fiber and the tensile member, the optical fiber terminal fixing member comprising:

a main body;

two fitting portions formed so as to project from both ends in a width direction of the main body and configured to fit respectively into two grooves provided on two outer circumferences of the two optical fiber terminals; and a fixing structure formed so as to project from a substantially middle in the width direction of the main body and configured to pass between the two optical fiber terminals to fix the optical fiber terminal fixing member to the housing, the fixing structure including a latching pawl provided at a front end of the fixing structure and being configured to engage the optical fiber terminal fixing member with the housing.

2. The optical fiber terminal fixing member according to claim 1, wherein a backlash of 0.5 mm to 1.5 mm is provided in the longitudinal direction when the fitting portions are fitted into the grooves.

3. The optical fiber terminal fixing member according to claim 2, further comprising a spring structure formed so as to project from the main body and configured to be inserted into the grooves of the optical fiber terminals to press the optical fiber terminals toward a front end of the optical fiber terminals so as to be stopped against a restricting surface of the housing.

4. The optical fiber terminal fixing member according to claim 3, wherein the optical connector comprises a plurality of optical fiber terminals arranged in parallel with each other, and the fitting portions and the spring structure of the optical fiber terminal fixing member are configured to be formed corresponding to each of the plurality of optical fiber terminals.

5. The optical fiber terminal fixing member according to claim 3, wherein the optical connector comprises the two optical fiber terminals arranged in parallel with each other, and the spring structure of the optical fiber terminal fixing member is configured to be formed between the two optical fiber terminals to press to stop the two optical fiber terminals.

6. An optical connector comprising:

two optical fiber terminals configured to be attached to each end of two optical fiber cables each including an optical fiber, a tensile member disposed along a longitudinal direction of the optical fiber, and a coating portion that covers the optical fiber and the tensile member;

a housing that holds the two optical fiber terminals; and the optical fiber terminal fixing member according to claim 1 that is inserted into the housing to fix the two optical fiber terminals to the housing, wherein the housing comprises a fixing structure to fix the optical connector to another optical connector in a removable manner.

7. The optical connector according to claim 6, wherein the fixing structure is a latch structure to engage the optical connector with another optical connector.

8. Optical fiber cables with a connector, comprising:

two optical fiber cables each including an optical fiber, a tensile member disposed along a longitudinal direction of the optical fiber, and a coating portion that covers the optical fiber and the tensile member; and the optical connector according to claim 7 that is attached to each end of the two optical fiber cables.

* * * * *